(12) United States Patent
Habrich

(10) Patent No.: US 10,753,723 B2
(45) Date of Patent: Aug. 25, 2020

(54) METHOD AND DEVICE FOR DETERMINING THE SPATIAL POSITION OF AN OBJECT BY MEANS OF INTERFEROMETRIC LENGTH MEASUREMENT

(71) Applicant: Björn Habrich, Darmstadt (DE)

(72) Inventor: Björn Habrich, Darmstadt (DE)

( * ) Notice: Subject to any disclaimer, the term of this patent is extended or adjusted under 35 U.S.C. 154(b) by 57 days.

(21) Appl. No.: 15/774,540

(22) PCT Filed: Nov. 8, 2016

(86) PCT No.: PCT/EP2016/076997
§ 371 (c)(1),
(2) Date: May 8, 2018

(87) PCT Pub. No.: WO2017/081017
PCT Pub. Date: May 18, 2017

(65) Prior Publication Data
US 2019/0285398 A1   Sep. 19, 2019

(30) Foreign Application Priority Data

Nov. 9, 2015   (DE) .................. 10 2015 119 274

(51) Int. Cl.
*G01B 9/02*   (2006.01)
*G01S 17/06*   (2006.01)

(52) U.S. Cl.
CPC .......... *G01B 9/02039* (2013.01); *G01S 17/06* (2013.01)

(58) Field of Classification Search
CPC .............. G01B 11/007; G01B 11/0675; G01B 9/02039; G01B 5/012; G01S 17/06; G01S 17/08; G01S 17/66; G01C 15/002
See application file for complete search history.

(56) References Cited

U.S. PATENT DOCUMENTS

| 4,964,218 A | 10/1990 | Morghen |
| 2002/0176090 A1 | 11/2002 | Ohsaki et al. |
| 2003/0227616 A1* | 12/2003 | Bridges ................ G01B 11/002 356/139.06 |
| 2008/0111985 A1 | 5/2008 | Bridges |

(Continued)

FOREIGN PATENT DOCUMENTS

| JP | 2012137382 A | 7/2012 |
| WO | 2015082683 A2 | 6/2015 |

OTHER PUBLICATIONS

International Search Report and Written Opinion dated Jan. 30, 2017 in International (PCT) Application No. PCT/EP2016/076997, English translation of ISR only.

*Primary Examiner* — Michael P LaPage
(74) *Attorney, Agent, or Firm* — McDermott Will & Emery LLP

(57) ABSTRACT

The invention relates to a method for determining the distance to a movable target object and/or the position of said movable target object and comprises the steps of directing a coherent, focused measurement beam at the spherical target object, which has a convex reflective surface, in such a way that the center of the target object lies at the focus of the measurement beam, and determining a distance between the target object and a reference point by interferometrically superposing the measurement beam reflected by the target object with a reference beam.

16 Claims, 5 Drawing Sheets

(56) References Cited

U.S. PATENT DOCUMENTS

| | | | |
|---|---|---|---|
| 2011/0013200 A1* | 1/2011 | Kato | G01B 11/002 356/625 |
| 2013/0208128 A1* | 8/2013 | Steffensen | G01C 15/002 348/169 |
| 2015/0022826 A1* | 1/2015 | Cramer | G01S 17/66 356/620 |
| 2015/0241194 A1* | 8/2015 | Nakagawa | G01B 21/045 702/95 |
| 2015/0373321 A1* | 12/2015 | Bridges | G01S 17/023 348/46 |
| 2016/0178348 A1* | 6/2016 | Nagalla | G06F 3/017 250/203.2 |

* cited by examiner wavefronts of a parallel mirror surface

*Surface shifted parallel
**Surface to be measured

View A:

METHOD AND DEVICE FOR DETERMINING THE SPATIAL POSITION OF AN OBJECT BY MEANS OF INTERFEROMETRIC LENGTH MEASUREMENT

CROSS REFERENCE TO RELATED APPLICATIONS

This application is a United States National Phase under 35 U.S.C. § 371 of International Application No. PCT/EP2016/076997, filed on Nov. 8, 2016, which claims the benefit of, and priority to, German Patent Application No. 10 2015 119 274.8, filed on Nov. 9, 2015, both of which are hereby incorporated by reference in their entirety for all purposes.

FIELD OF THE INVENTION

The disclosure relates to a method and a device for the contactless determining of the spatial position of an object by means of interferometric length measurement.

BACKGROUND OF THE INVENTION

The measuring of the spatial position of objects has many areas of application, for example in the control or regulating of various machines and apparatus in industry, medicine and in particular in robotics, where the accuracy of the positioning of the tip of a robot arm, tracer or the like substantially determines the manufacturing accuracy that is possible. There is therefore a need for methods that determine with great accuracy the location position and where applicable the position in space of an object, such as for example a robot gripper arm.

Distances can be determined contactlessly by measuring a path length covered by an electromagnetic beam, for example light. For this, the electromagnetic beam passes along a path between a reference position and the object once or a number of times, so that from the path length covered by the beam the distance can be derived (TOF method).

DE 10 2004 037 137 A1 proposes the combination of a TOF measurement with a further optical measuring method such as a triangulation method or an interferometric measuring method in order to improve measuring accuracy.

DE 10 2008 045 387 A1 and DE 10 2008 045 386 A1 describe position determination using light pulses, whereby the phase position of a signal component is determined, which oscillates by a multiple of the repetition rate of the sequence of light pulses, as a result of which in a relatively large distance range the determining of distances can be achieved with great accuracy.

DE 10 2010 062 842 A1 describes a method for determining the absolute position of a target object using an interferometric measuring arrangement whereby an intensity of the measuring signal after passing along the measuring path is determined as a function of time, in order to determine rough information for a length of the measuring path and by means of a reference beam a phase signal is determined as fine information for a length of the measuring path and is combined with the rough information.

The task of the disclosure is to set forth a method and device for determining the position of an object, which can be used for many applications and enables great measuring accuracy to be achieved.

SUMMARY OF THE INVENTION

According to the disclosure this task is solved by a method for determining the position of a movable target object comprising the steps of directing a coherent, focused measurement beam at the spherical target object, which has a convex reflective surface, in such a way that the centre of the target object lies at the focus of the measurement beam, and determining a distance between the target object and a reference point by interferometrically superposing the measurement beam reflected by the target object with a reference beam.

The method according to the disclosure can be used for many applications and enables the determining of the spatial position of a target object with great measuring accuracy, because interferometric length measurement is one of the most accurate methods for determining the distance of an object. With this a resolution can be obtained still well below the wavelength of the beam used, such as for example visible or infrared light. A precondition for an interferometric measurement is however a coherent superposing of the beam reflected by the target object with an internal reference beam. The measuring device ensures in this that the measurement beam strikes the ball centrally and so a maximum interference contrast and therefore a best possible measuring accuracy is obtained. The signal beamed back from the target ball is independent of its position in space.

The disclosure further sets forth a device for determining the position of a target object movable in space, comprising a light source for producing a coherent measurement beam, imaging optics configured for focusing the measurement beam on the spherical target object in such a way that the centre of the target object lies at the focus of the measurement beam, a device for producing a reference beam from the measurement beam, a detector for detecting an interference signal produced by the superposition of the measurement beam reflected by the target object with the reference beam, a tracking device for continuously tracking the focus of the measurement beam, so that the focus of the measurement beam lies in the area of the target object, and an evaluation device for determining a distance between the target object and a reference point by evaluating the interference signal.

In order to obtain a good interference signal the measurement beam is focused on the target object such that the curvature of the wavefronts of the measurement beam beamed on to the target object on the surface of the target object corresponds to the curvature of the convex surface of the target object.

For a continuous measurement, the focus position of the measurement beam preferably is tracked continuously on the position of the target object. The rough determination of the position of the target object used for this may be carried out by means of a position-detecting camera or by determining an intensity reflected by the target object of a non-focused and preferably non-coherent control beam.

The device according to the disclosure may have a movable lens with a variable focal length for tracking the focus of the measurement beam on the position of the target object.

The spatial position of a target object may according to the disclosure be determined by means of a plurality of measurement beams beamed from different positions and directed at the target object. According to a variant of this method, the topography of a surface may be determined by means of spatial position determination of a spherical target object movable on the surface by means of a plurality of measurement beams. The number of measurement beams directed at the target object may be selected depending on the degrees of freedom of the target object and the required redundant measurements, which can increase the measuring accuracy.

Furthermore, according to the disclosure the position and directing of an object in space may be determined whereby a plurality of, for example three, spherical target objects spaced apart from each other are disposed on the object, the spatial positions of which are determined by the interferometric method. The preferably spherical target objects may be configured distinguishably from each other for example by shape, colour, size or position.

DESCRIPTION OF THE FIGURES

The invention is described in detail below on the basis of embodiments with reference to the drawings. The figures show.

DETAILED DESCRIPTION OF AN EMBODIMENT

Figure 1:
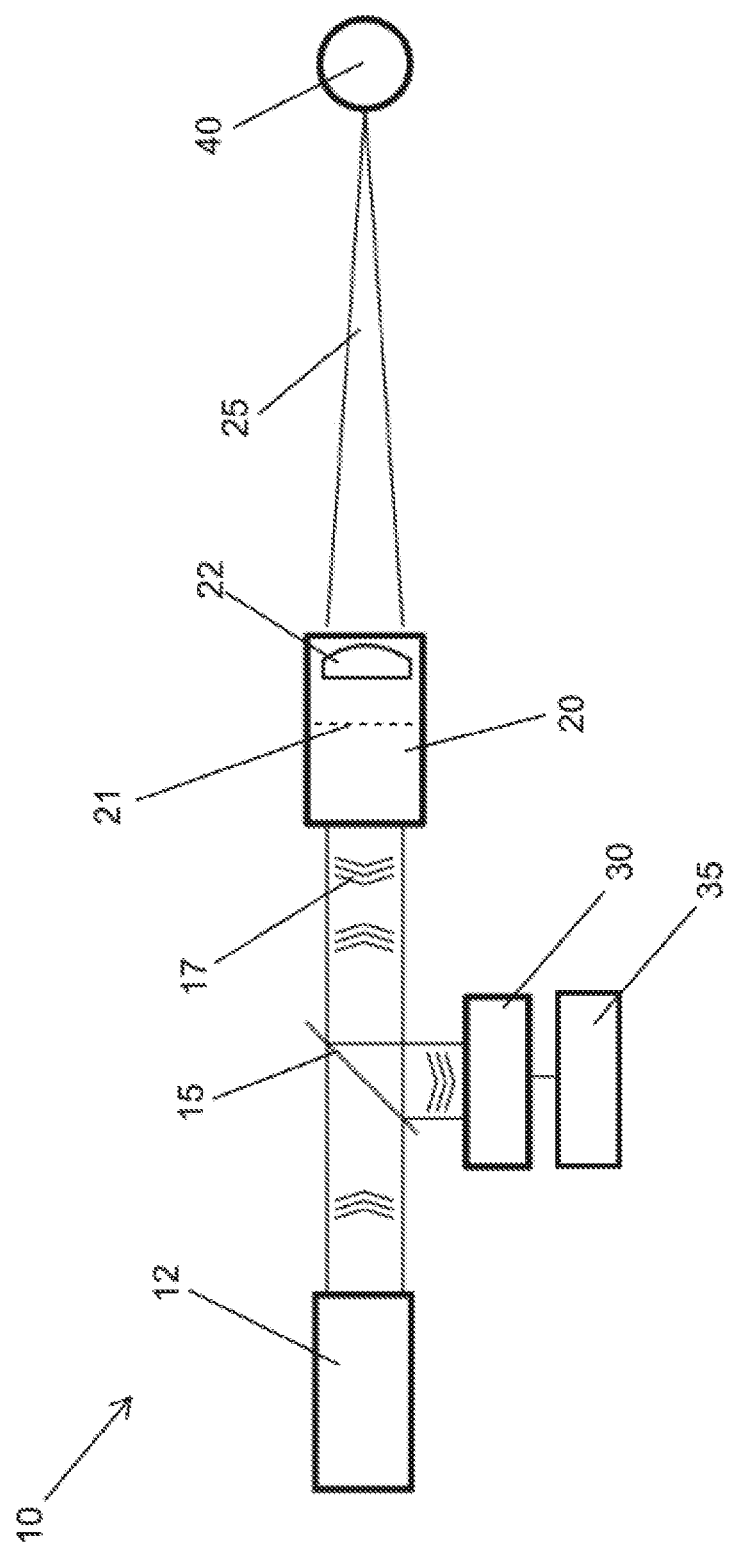
FIG. 1 a schematic representation of the structure of an embodiment of the device according to the disclosure for determining the position of a target object.

FIG. 1 shows a schematic representation of an embodiment of the device 10 according to the disclosure for determining the position of a target object. To produce a coherent measurement beam a light source 12 is provided, preferably a laser, which produces coherent visible or infrared light. The measurement beam is sent to a tracking unit 20 with a lens system 22 which focuses the measurement beam 25 on the target object 40. Also, a device 21 is provided for producing a reflected reference beam 17. This may be configured for example as a partial reflecting mirror or as a combination of beam splitter and mirror. In this, the reference beam may be produced in front of, inside or also after the tracking unit. The signal reflected by the target object 40 preferably runs on the same light path back to a beam splitter 15, is reflected on to the detector 30 together with the reference beam 17 and on this path interferes with the reference beam 17. The interference signal received by the detector is evaluated by an evaluation unit 35 (which may include a general purpose processor, application integrated circuit, or other processor implementing laser interferometric calculations known in the art) and in this way the difference in the light paths of the reference beam 17 and of the measurement beam 25 is determined. By a calibration of the system, in this way this enables the distance of the target object 40 to be measured.

Figure 7:
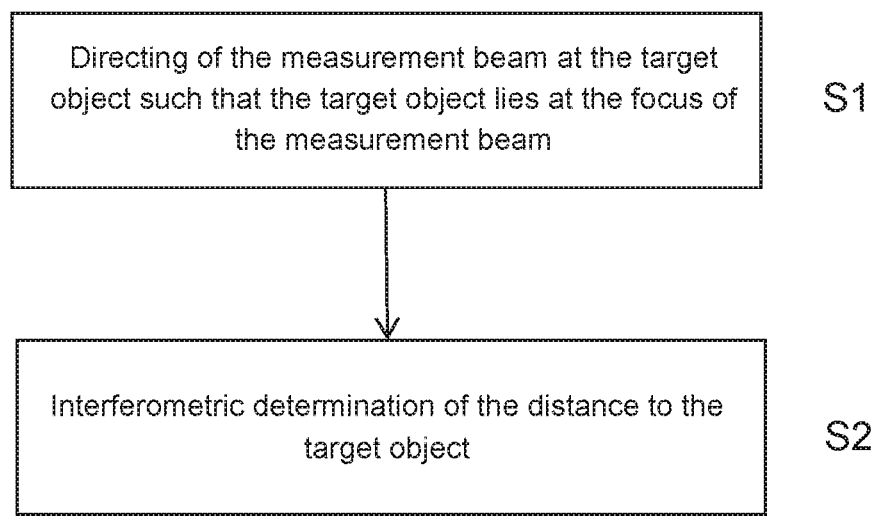
FIG. 7 a schematic flow diagram to explain an embodiment of the method according to the disclosure for determining the position of a target object.

The method according to the disclosure for determining the position of a target object is shown in its most general form in FIG. 7. In a first step S1 the measurement beam 25 is directed at the target object such that the target object lies at the focus of the measurement beam and in this way a coherent reflection beam is produced which with a reference beam produces an interference signal. In a second step S2 the distance from a reference point to the target object is determined interferometrically.

The target object 40 is a body with a reflecting convex surface, preferably a ball with a mirrored surface. When the measurement beam 25 strikes the target object 40 centrally, the measurement beam is reflected and returns preferably along the same beam path back to the beam splitter 15, where the returning beam superposes itself interferometrically with the reference beam 17 and the intensity of the beam is determined by the detector 30.

Preferably the beams between the light source 12, tracking unit 20 and detector 30 are carried in optical fibres. The light source 12 together with the device 21 for producing the reference beam, the target object 40 and the detector 30 form in this way the interferometer that serves for the distance measurement. In this the light path of the reference beam to the reflection surface of the reference beam-producing device 21 constitutes the reference length for the distance measurement. Conventional interferometers allow only a relative length measurement of less than half a wavelength. Moreover, with modern methods also larger relative and even absolute distances can be measured. If an interferometer for absolute distance measurements is not available, the proposed method may be implemented nevertheless if reference points are created for the relative measurement.

A great advantage of the use according to the disclosure of reflecting balls as target objects is that the target object may be configured entirely passively. A directing of the target object on the measurement beam is not needed. Conversely, it is necessary however that the ball is struck by the measurement beam with great accuracy in the centre. This is achieved preferably by a multi-stage system for deflecting the beam: First the position of the ball can be determined roughly, and the decoupling unit directed at the ball. In the next step the centre of the ball is found. The interferometric methods can only be used here. As the actual length measurement is possible quickly, the ball can be followed also with dynamic systems and the distance to the centre of the ball measured at short intervals. The rough directing on the ball 40 may for example be achieved by a position determination by means of a camera known per se (not shown): The position of a ball can be determined by triangulation with the aid of one or more cameras together with suitable image evaluation software. Alternatively, the rough directing on the ball may be carried out by means of back reflection from the ball. With the aid of bright, non-focused light the back reflection of the ball can be searched for with the same optics that are also used for the measurement beam. It is important, however, that no interferences arise as is needed for the measurement subsequently. Only then does the reflected power fall monotonically with the distance from the centre of the ball. This method can be carried out with an additional laser, but also with the laser of the interferometer itself, whereby the laser wavelength is modulated.

Figure 2:
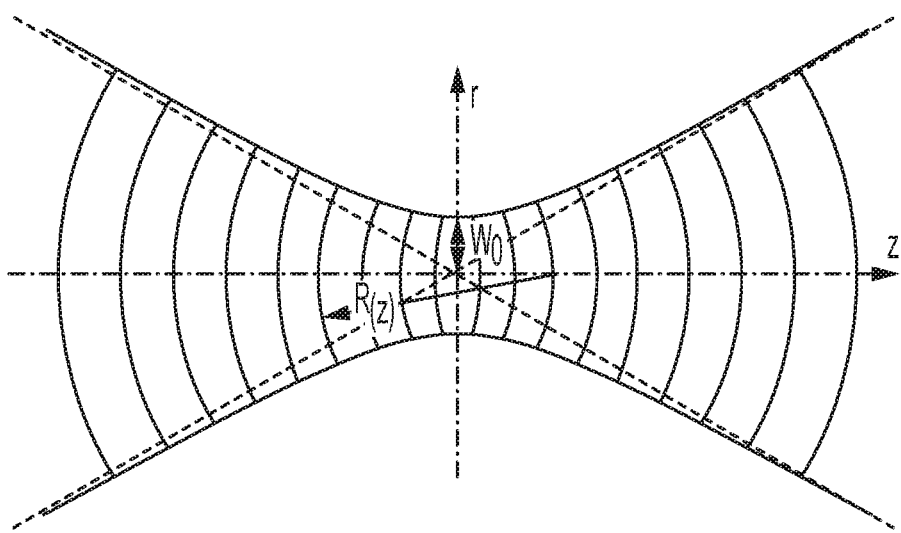
FIG. 2 a schematic representation of the wavefronts of the measurement beam in the area of the focal point.
Figure 3:
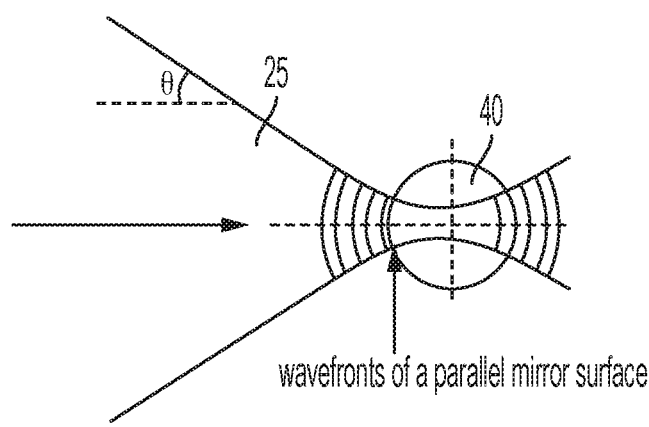
FIG. 3 a schematic representation of the wavefronts of the measurement beam striking and reflected on the target object.

The reflection of the measurement beam 25 on the target object 40 is explained below in detail by means of FIGS. 2 and 3.

For interferometric length measurement on a convex, in particular spherical surface, as well as striking exactly the reflection point on the ball 40, two important conditions have to be satisfied:
1. The power of the ball reflex absorbed by the interferometer is sufficient to modulate the local reference beam with sufficient signal-to-noise ratio.
2. The run-time distribution inside the reflected and picked up beam is sharp. In other words, there are not any partial beams that have covered a path shorter or longer by more than a fraction of the light wavelength.

Both these conditions can be satisfied with beam forming adapted to the distance of the target object 40. Further requirements arise from the need to strike the ball with the measurement beam centrally.

The interaction of measurement beam 25 and target object 40 is described below with the aid of Gaussian optics. This is necessary because the laws of beam optics—that largely follow intuition—fail at the point of the focus. The light that emerges from a single-mode fibre can be described very well with Gaussian optics. The focus of a Gaussian beam is shown in FIG. 2. The focus is not a point but a waist with a minimum diameter. The curvature of the wavefronts is shown in an exaggerated way for illustrative purposes. What is important here above all is that the focus cannot be arbitrarily small, but rather because of the wavelength and the beam divergence there is a lower limit for the minimum diameter. The curvature of the wavefronts is a non-linear function of the distance from the focal point:

$$R(z) = z\left(1 + \left(\frac{z_0}{z}\right)^2\right) \quad (1)$$

with the so-called Rayleigh length $z_0$ as a function of the minimum beam radius $\omega$ (waist) and the wavelength $\lambda$.

It can be seen from equation (1) that the wavefronts in the Gaussian beam have a minimum radius of curvature at a distance of the Rayleigh length. If the beam can now be focused such that this minimum radius of curvature is less than or the same as that of the reflecting ball, a perfect mirroring of the beam is possible without light path errors. The beam is mirrored in itself. This case occurs when the ball is covered by the wavefront of the same radius. This case is shown schematically in FIG. 3. An in-phase reflection takes place on an identical beam. This enables full interference contrast on the ball and optimum pick-up efficiency of the reflex.

The small waist needed for the radius of curvature can be obtained by focusing with a correspondingly large divergence.

For a ball with a diameter of for example 10 mm therefore a divergence of 0.8° is needed, which defines the minimum beam diameter at the position of the last lens, i.e. its minimum aperture. At the maximum distance of 1 m for example a decoupler with an effective diameter of at least 28 mm would be needed in order to produce a waist of 35 μm, which then has a minimum wavefront radius of 5 mm.

With this it is possible to focus the measurement beam in such a way that an in-phase reflection takes place over the whole of the cross-section. This subsequently enables an interference signal with maximum contrast. With increasing distance, however, a beam-forming optic is needed with an ever-larger aperture and focal length. This is possible however at least in the range up to a few metres.

Figure 6:
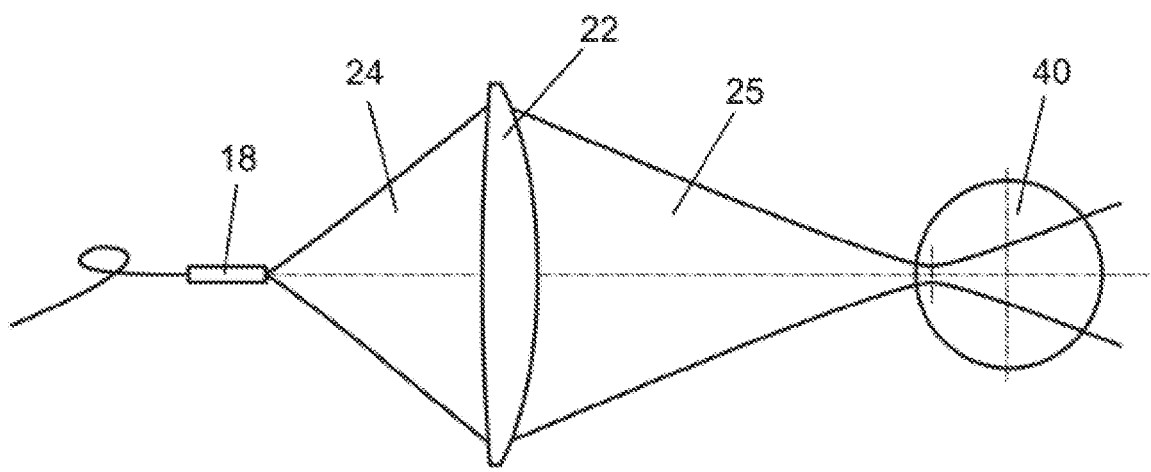
FIG. 6 a schematic representation of an embodiment of a tracking device according to the disclosure for the continuous tracking of the focus of the measurement beam.

The directing and tracking of the measurement beam 25 on the target object 40 is explained below by means of a concrete embodiment with reference to FIG. 6. The measuring light from the interferometer comes from a single-mode fibre 18 and in the embodiment shown is focused by a single lens 22 at a distance of 90 mm. The resulting (calculated) waist has a diameter of 52.5 μm. This is accompanied by a Rayleigh length of 1.4 mm and accordingly a minimum wavefront radius of 2.8 mm Under ideal conditions the waist lies 4.57 mm behind (inside) the surface of the ball. Precisely then the wavefronts cover the ball.

Figure 4:
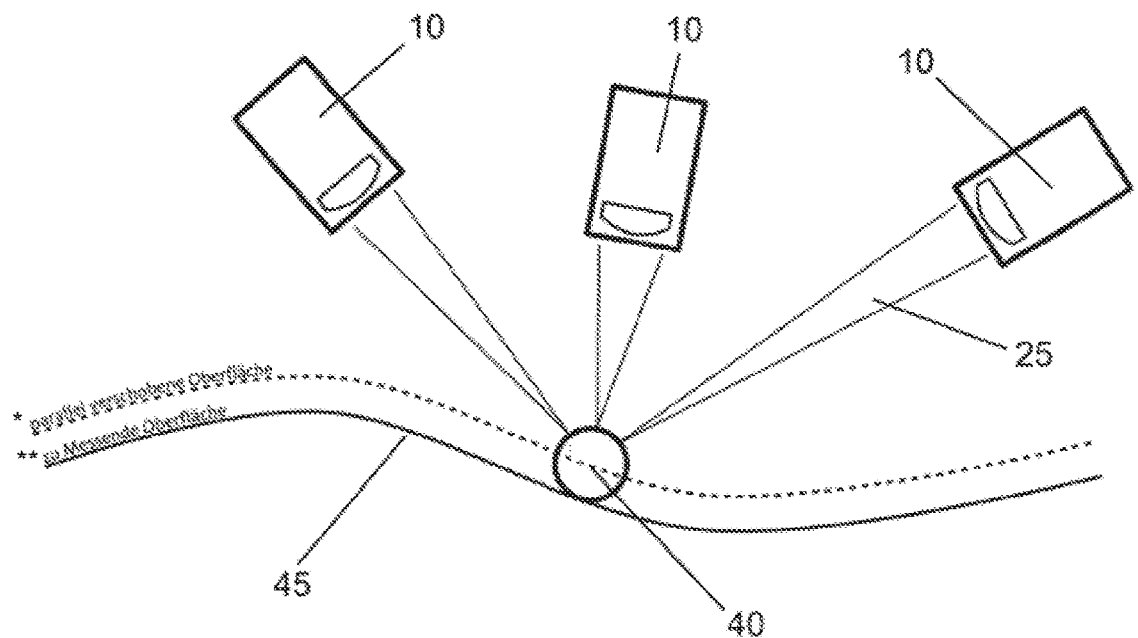
FIG. 4 a schematic representation of a variant of the method according to the disclosure for determining the topography of a surface.

According to a further configuration of the disclosure, with a combination of a plurality of measurement beams and interferometers the distances of a target object 40 to various reference points can be determined so that from the individual distances the position of the target object 40 in space can be calculated. With this the advantage of the method according to the disclosure can be seen, in that a directing of the target object on the measurement beam is not needed. A variant of the position determination of the target object 40 in space using a plurality of distance-measuring devices 10 disposed at different positions is shown schematically in FIG. 4. In the example shown, the spherical target object 40 moves freely on a surface to be investigated 45, the topography of which can be scanned with great measuring accuracy taking into account the radius of the spherical target object. The number of target-detecting devices 10 used can be selected based on the degrees of freedom of the target object 40. To increase the measuring accuracy by redundancy, more measurement beams can also be used as degrees of freedom of the target object. The method described can be used for example in the area of materials testing.

Figure 5:
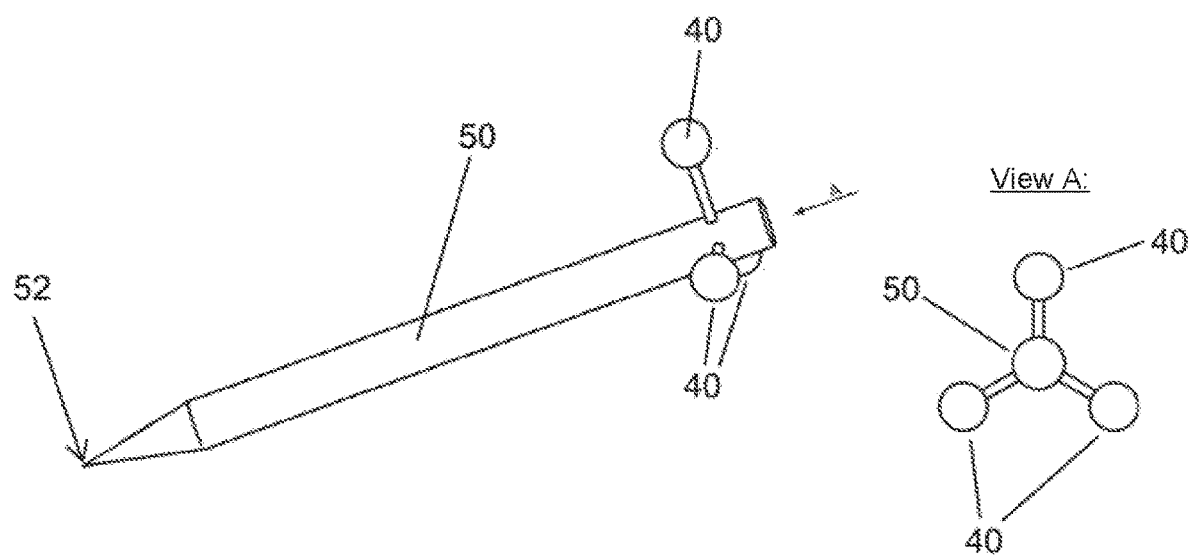
FIG. 5 a schematic representation of a variant of the method according to the disclosure for determining the position and directing of an object in space.

According to yet another configuration of the disclosure, the position and directing of an object in space can be determined, whereby depending on the symmetry of the object and any redundancies that may be required with possible shadowing of one of the target objects, two, three or a plurality of spherical target objects spaced apart from each other are disposed on the object, the spatial positions of which are detected by the interferometric method. This is shown by way of example in FIG. 5. Three spherical target objects 40 are disposed on a pen-shaped object 50 at defined distances. By determining the position of all three target objects 40 by means of three measurement beams in each case—as described above—for example the position and also the directing of the object 50 in space and therefore also the position of a measuring tip 52 can be determined with great measuring accuracy. This opens up applications in particular in the area of robotics. To distinguish readily, the plurality of target objects 40 spaced apart from each other may be balls with a different shape, colour, size or position.

In summary, the disclosure sets forth a versatile contactless method that can be used in many applications and a device for the precise determining of the position, in particular the spatial position, of a target object by means of interferometric length measurement.

What is claimed is:
1. A method for determining the positon of a movable spherical target object in space, comprising the steps of:
   directing a coherent, focused measurement beam at the spherical target object which has a convex reflective surface, in such a way that the centre of the spherical target object lies at a focus of the measurement beam, and determining a distance between the spherical target object and a reference point by interferometrically superposing the measurement beam reflected by the spherical target object with a reference beam,
wherein the focus position of the measurement beam is tracked continuously on the target object such that the radius of curvature of wavefronts of the measurement beam at the surface of the target object is equal to the radius of curvature of the convex surface of the target object.

2. A method according to claim 1, wherein a rough positioning of the spherical target object for tracking the focus position of the measurement beam is carried out by a position-detecting camera.

3. A method according to claim 1, wherein a rough positioning of the spherical target object for tracking the focus position of the measurement beam is carried out by determining an intensity reflected by the spherical target object of a non-focused control beam.

4. A method according to claim 3, wherein the control beam is not coherent.

5. A method according to claim 1, wherein the reference beam is produced by partial reflection from the measurement beam.

6. A method according to claim 1, wherein the spatial position of the spherical target object is determined using a plurality of measurement beams beamed from different positions and directed at the spherical target object.

7. A method according to claim 6, wherein the number of measurement beams directed at the spherical target object is selected based on the degrees of freedom of the spherical target object and a desired number of redundant measurements.

8. A method according to claim 1, further comprising determining topography of a surface by determining the spatial position of the spherical target object movable on the surface.

9. A method for determining the position and directing of an object in space, wherein a plurality of spherical target objects spaced apart from each other are disposed on the object, the method comprising determining the spatial positions of each of the plurality of spherical target objects according to the method of claim 6.

10. A method according to claim 9, wherein the plurality of spherical target objects spaced apart from each other are configured distinguishably from each other.

11. A method according to claim 9, further comprising determining a spatial position of a measuring tip based on defined distances between the measuring tip and the plurality of spherical target objects.

12. A device for determining the position of a spherical target object movable in space which has a convex reflective surface, comprising:
   a light source for producing a coherent measurement beam;
   imaging optics configured for focusing the measurement beam on the spherical target object such that the centre of the spherical target object lies at a focus of the measurement beam;
   means for producing a reference beam from the measurement beam;
   a detector for detecting an interference signal produced by a superposition of the measurement beam reflected by the spherical target object with the reference beam;
   a tracking device for continuously tracking the focus of the measurement beam so that the focus of the measurement beam lies in the center of the spherical target object, wherein a focus position of the measurement beam is tracked continuously on the target object such that the radius of curvature of wavefronts of the measurement beam at the surface of the target object is equal to the radius of curvature of the convex surface of the target object; and
   an evaluation device for determining a distance between the target object and a reference point by evaluating the interference signal.

13. A device according to claim 12, wherein the means for producing a reference beam has a reflective surface.

14. A device according to claim 12, comprising a position-detecting camera for determining a rough position of the spherical target object for tracking the focus position of the measurement beam.

15. A device according to claim 12, comprising a light source for producing a non-focused control beam, wherein the detector is configured to detect an intensity of the control beam reflected by the spherical target object as a control variable for determining a rough position of the spherical target object.

16. A device according to claim 12, wherein the imaging optics comprise having one or a plurality of movable lenses for tracking the focus of the measurement beam to the position of the spherical target object.

* * * * *